United States Patent [19]

Takemoto et al.

[11] Patent Number: 5,058,055
[45] Date of Patent: Oct. 15, 1991

[54] SYSTEM FOR PRINTING LABELS AND TAGS, AND A CONVERTER USED THEREIN

[75] Inventors: Shigetoshi Takemoto, Chiba; Osamu Takeuchi, Tokyo, both of Japan

[73] Assignees: Naigai Clothes Co., Ltd., Osaka; Nihon Systex Ltd., Tokyo, both of Japan

[21] Appl. No.: 210,746

[22] Filed: Jun. 23, 1988

[30] Foreign Application Priority Data

Dec. 28, 1987 [JP] Japan .................. 62-329569

[51] Int. Cl.⁵ .................................. G06F 3/12
[52] U.S. Cl. .......................... 364/900; 364/519; 364/927.81; 364/927.99; 364/930.7
[58] Field of Search ............ 364/519, 200 MS File, 364/900 MS File

[56] References Cited

U.S. PATENT DOCUMENTS

| 4,641,262 | 2/1987 | Bryan et al. | 364/900 |
| 4,641,263 | 2/1987 | Perlman et al. | 364/900 |
| 4,875,174 | 10/1989 | Olodort et al. | 400/63 |

Primary Examiner—Allen R. MacDonald
Assistant Examiner—Debra A. Chun
Attorney, Agent, or Firm—Koda and Androlia

[57] ABSTRACT

A personal computer such as one of the IBM 5550 range (represented by the IBM 5530, 5540 and 5560) cannot be connected to a label printer because the two machines have completely different control commands. If a converter is placed between a personal computer of the said type and the label printer, the converter can convert or arrange the data, loop-back any meaningless or unsuitable signals passing between the two devices, and discard any unnecessary control commands, thus permitting personal computers of the above type, which are increasingly popular, to be connected to a label printer and used effectively, and further permitting the online printing of tags and labels via a connection to a host computer.

3 Claims, 3 Drawing Sheets

SYSTEM FOR PRINTING LABELS AND TAGS, AND A CONVERTER USED THEREIN

BACKGROUND OF THE INVENTION

1. Field of the Invention

This invention concerns a converter suitable for the connection of a printer used for printing tags and labels, including brand name tags, price cards, slips, and stickers, a particular example being a bar code printer, to a stand-alone personal computer (for example an IBM 5550 made by IBM) of a different model, or to similarly different multi-purpose workstations, work stations or personal computers connected online to an office computer (for example, the said IBM 5550 connected to a System 38 office computer made by IBM); and a system used to print tags and label which uses this converter.

2. Prior Art

Conventionally, tags and labels, including brand name labels and price tags (called tags and labels below) have been printed by connecting a special label printer to a stand-alone personal computer or to a personal computer used in conjunction with an office computer (host computer); however, connection has been restricted to certain particular types of machines which could match the control commands output by the label printer and the computer respectively. Two machines from different manufacturers, or different models from the same manufacturer, could hardly ever be connected if data control codes and kanji character codes and the codes which controlled them were different.

While there had been some cases of the connection of a label printer to a personal computer of a different type through use of an RS-232C interface, because there were few online utilities which supported an RS-232C interface, it was possible to print labels only by first outputting the data from the online terminal, and then having an operator re-input that output data to the personal computer with the RS-232C interface, and sending the data to the label printer via a program.

Thus while it was possible to connect a personal computer with an RS-232C interface to a label printer, it could not be used online in any practical way. In particular, users such as supermarkets, chainstores, department stores, and other retailers, wished to display their trade names in a distinctive way and print labels in various different shapes, graphics and print positions, and also to be able to accurately print labels where and when required. Thus it was essential to be able to use a multi-purpose workstation, work station or personal computer connected to the host computer to retrieve the necessary data stored in a data base on the host computer, and then send the required data in the desired format to the label printer for online printing of tags and labels. This requirement could not be satisfied using a personal computer with the said RS-232C interface.

Recently an increasing number of diverse multipurpose workstations, workstations and personal computers (such as the IBM 5550, made by IBM) with Centronics interfaces have appeared on the market. While these types of computers, when connected to a host computer (such as the System 38 from IBM) in a network, can be operated very effectively, it was still impossible to connect them to a label printer because of the differences between the control commands. Thus at the current time these computers are not used to print labels.

BRIEF SUMMARY OF THE INVENTION

This invention provides a converter which when interposed in terms of electric signals between a personal computer with a Centronics interface (such as an IBM 5550) and a label printer, can intercept the control commands passing between the two devices and rearrange or convert them.

This converter is constructed of the following elements. It has a signal loop-back means for looping back to the said computer any meaningless or unsuitable signals picked up by the label printer; a print control command discard means for discarding those print control commands from the said computer which are not required by the label printer; a fault-select signal conversion means for converting the fault signals from the said label printer to select signals for computer use; a paper-end or carbon-end to busy signal conversion means which converts the paper-end or carbon-end signal from the label printer to a busy signal for use by the computer; a logic reversal means for converting the select signals from the said computer to positive logic for output to the label printer; a control code conversion means which pre-sets a special character string in the said computer which when output is converted to a control code (ESC) for sending to the label printer; an Image data/Standard code conversion means which converts character and numeric image data sent from the said computer to Standard codes; a common-use kanji code discrimination means for identifying common-use kanji character codes; a special character pattern conversion means for converting Second Level kanji codes to special character patterns; and a ROM (Read-Only Memory) for matching the image data input using the said Image data and Standard code conversion means with Standard codes, storing it as font image data, and recording the said special character patterns. In addition, this invention provides a means of connecting the converter to both the said personal computer and the label printer and intercepting the electrical signals which pass between them, and a means of connecting the personal computer to the host computer as being an office computer, and further permits the retrieval of the necessary information already stored in the data base on the host computer via various terminals connected to various host computers, and through this means of the said host computer, personal computer and converter, provides a system for printing tags and labels at the label printer.

In the preceding and following descriptions, "personal computer having a Centronics interface" refers in the broad sense to a multi-purpose workstation or a workstation.

DESCRIPTION OF THE PREFERRED EMBODIMENTS

Figure 1:
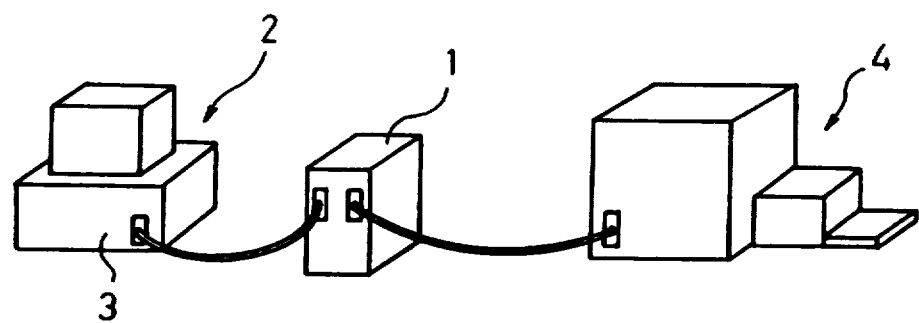
FIG. 1 is a drawing showing the converter of the first embodiment of this invention in actual use.

The converter 1 as shown in FIG. 1 is connected between the main body 3 of the commonly-available personal computer IBM 5550 2 and the bar code label printer 4 (SATOC M-8300, manufactured by Sato Pricing K.K.).

Figure 2:
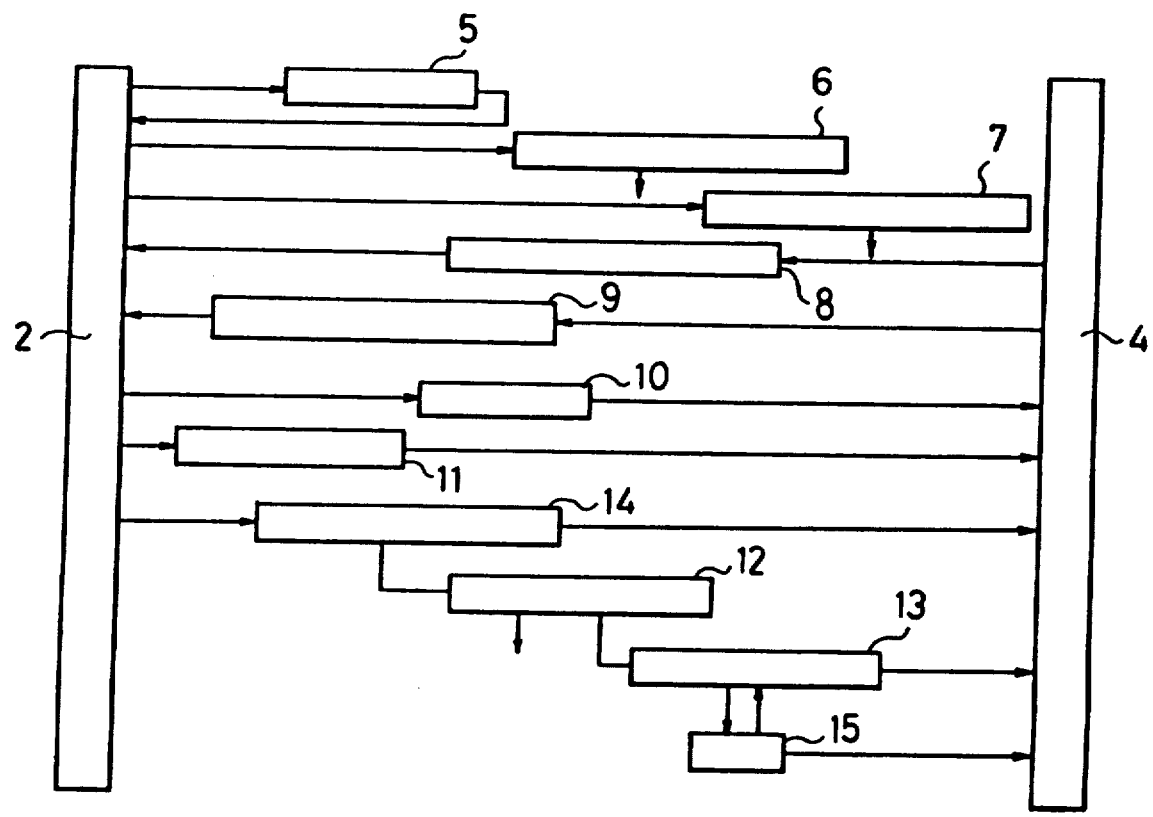
FIG. 2 shows the basic structure of the converter.

The converter 1 of this embodiment is constructed, as shown in FIG. 2, of a signal loop-back means 5 for looping-back meaningless or unsuitable signals to the said label printer 4; a print control command discard means 6 for discarding print control commands from the IBM 5550 2 which are not required by the said label printer 4; a padding character discard means 7 for discarding printer check padding characters sent from a large computer such as a host computer (such as System 38)(described below) connected as being an office computer to the IBM 5550 2, to the printer connected to the IBM 5550 2; a fault-select signal conversion means 8 for converting signals from the said label printer 4 into signals for the said IBM 5550 2; a paper-end or carbon-end/busy signal conversion means 9; a logic reversal means 10 for converting select signals from the CPU 3 of the IBM 5550 2 and outputting them to the label printer 4; a control code (! @&) conversion means 11; a common-use kanji code such as a JIS Level 1 kanji code discrimination means 12; a special character such as a "gaiji" (foreign character) pattern conversion means 13 which converts Second Level such as JIS Level 2 kanji characters into special character patterns; and Image data to Standard code conversion means such as an ANK image to JIS code conversion means 14; and a ROM 15.

Of these various structural elements of the said converter, the logic reversal means 10 performs logic reversal in order to match the negative logic select signals from CPU 3 of the IBM 5550 2, with data from the label printer 4.

Signals which are meaningless or unsuitable for the label printer 4 only produce confusion in the label printer 4 when sent down to it, and thus are sent back to the CPU 3 of the IBM 5550 2 via the signal loop-back means 5.

Similarly, the padding characters for printer checks sent from an external host computer such as the System 38 (described below) to which the IBM 5550 is connected, and the printer control signals sent from the IBM 5550 2 are not required by the label printer, and that data is thus discarded by the print control command discard means 6 and the padding character discard means 7.

Further, those signals from the label printer 4 which in their current state cannot be arranged into signals suitable for the CPU 3 of the IBM 5550 2, are respectively converted by the fault-select signal conversion means 8 and the paper-end or carbon-end/busy signal conversion means 9 and transmitted to the IBM 5550 2.

Because the control codes for control of the label printer 4 are output as graphic image data and not as control codes from the CPU 3 of the IBM 5550 2, a control code conversion means 11 is provided for converting special character strings (! @&) preset in the CPU 3 of the IBM 5550 2 so that when the special characters string input to the CPU 3 of the IBM 5550 2 appears, a control code (ESC) is transmitted to the label printer 4, thus permitting the label printer 4 to be controlled by the CPU 3 of the IBM 5550 2.

The above description explains the conversion process for the control-type data such as signals required for controlling the label printer 4. The following will explain the structure of the common-use kanji code discrimination means 12, the special character pattern conversion means 13, and the Image data to Standard code conversion means 14.

The converter 1 of this embodiment converts the character and numeric data received from the CPU 3 of the IBM 5550 2 to Standard codes, sends the converted Standard codes to said label printer and prints them as bar codes. The conversion process is carried out by the Image data to Standard code conversion means 14.

However, because the Standard code conversion process must handle both common-use kanji codes and Second Level kanji codes, in order to print the Second Level kanji codes, a Second Level font ROM (Read-Only Memory) must be installed in the said label printer 4. However in current practice, Second Level kanji font ROMs are hardly ever incorporated in label printers; this has seemed unnecessary since for printing Point-of-Sale (POS) price labels only a few of the Second Level kanji characters, rarely used themselves, are required. Thus the converter of this embodiment is designed to record on a separate ROM 15, as special character patterns, those Second Level kanji characters which are used frequently on POS labels. In other words, for example, this kanji character "椎" is a Second Level character which is used relatively frequently on POS labels; this character cannot be printed as it is on the label printer 4 unless the Second Level kanji font ROM is mounted. However, if the said Second Level kanji character "椎" which is used with some frequency in POS price tags, is stored as a special character pattern for the said label printer 4, in the ROM 15 in the said converter 15, whenever the power is switched on to the converter 1, simultaneously the memory in the ROM 15 is recorded as a special character pattern in the said label printer. Then, whenever the kanji code "椎" is sent, it is first converted to a special character code before being sent to the said label printer.

Character and numeric data from the CPU 3 of the IBM 5550 2, is input to the Image data to Standard code conversion means 14 and converted to Standard codes. In other words, character and numeric data from the CPU 3 of the IBM 5550 2 is converted to Standard codes, but because the kanji codes on the IBM 5550 2 are internal codes and do not match the Standard codes, the common-use kanji codes are referenced in a table recorded in the said ROM 15 and converted to and output as character data corresponding to the common-use codes input by the common-use kanji code discrimination means 12.

Next the Image data to Standard code conversion process carried out by the Image data to Standard code conversion means 14 will be described with reference to the flowchart in FIG. 3.

Figure 3:
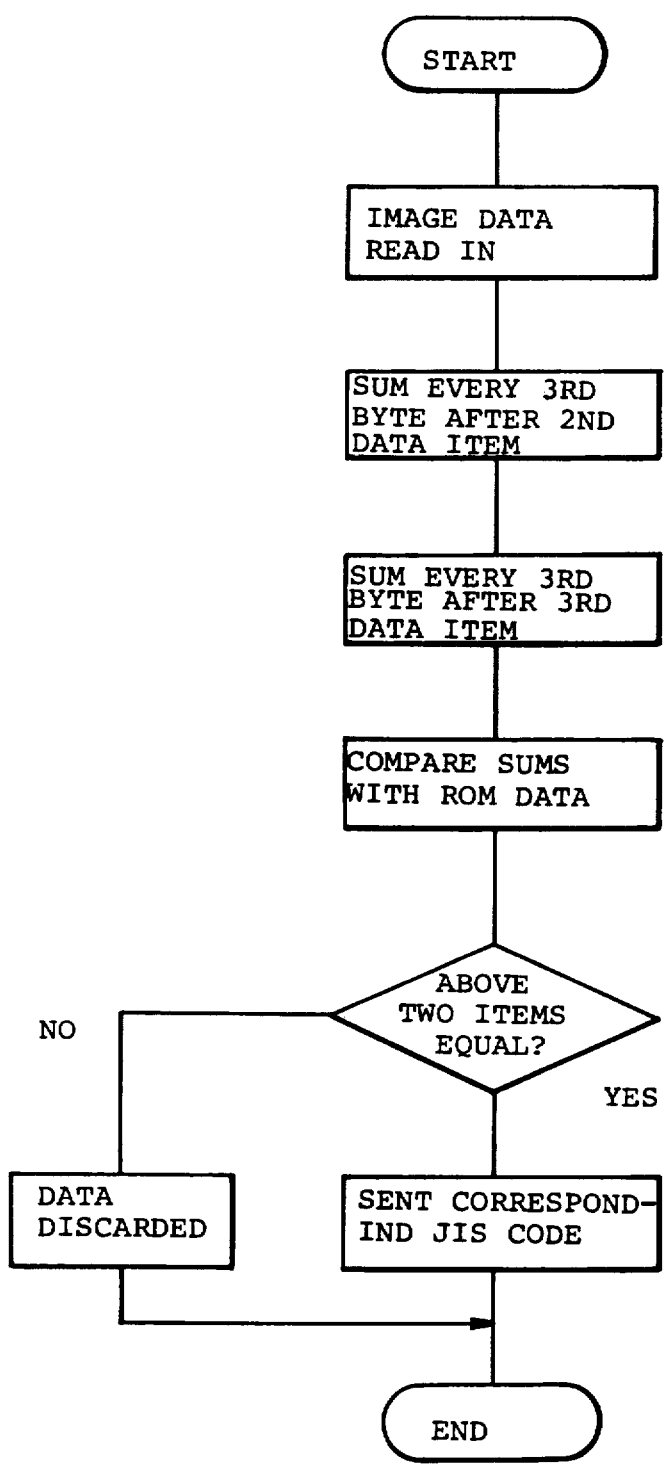
FIG. 3 is a flowchart of the Image data to Standard code conversion process which occurs in the converter in order to convert Image data to Standard codes.

The flowchart shown in FIG. 3 shows the basic concepts of the conversion process in the Image data to Standard code conversion means 14 which is used to convert character and numeric data from the CPU 3 of the IBM 5550 2 to bar codes which can be printed on the label printer.

As long as the same printer definition set at the factory before the CPU 3 of the IBM 5550 2 was shipped is used, Image character data is output as 24×18 dot matrix image data instead of as a one-byte Standard code, and thus cannot be printed as a bar code using the said label printer 4.

Figure 4:
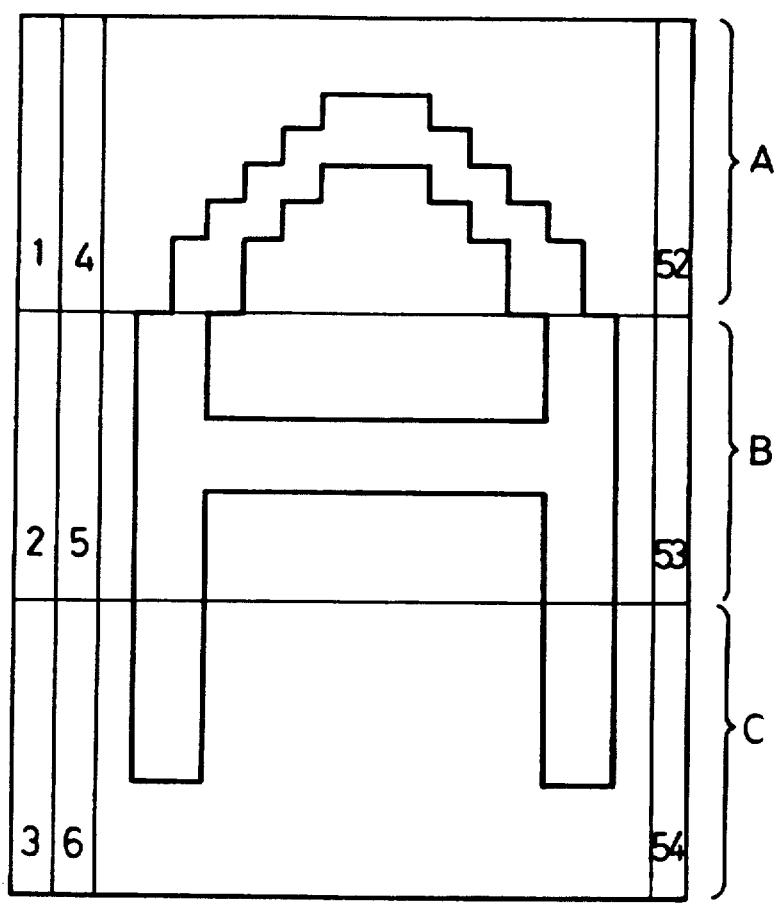
FIG. 4 shows the letter 'A' displayed as an 24×18 byte graphics element, and the corresponding font image data.

FIG. 4 shows the letter 'A' displayed in a 24×18 byte graphics structure. This structural image element expressed as a 24×18 byte matrix may be split into three parts, a top line A area, a middle line B area and a bottom line C area. Then, if the number of dots representing the character in each of these three areas of the graphic element is counted, the corresponding character or number can be specified as the corresponding Standard code. The image data for the character or numeric previously sent as image data can be matched to a Standard code, and recorded on the ROM 15 as the result of the calculation.

Thus when the image data is sent from the IBM 5550 CPU 3 in three portions—line A (1, 4, 7, 10, 13 . . . 43, 46, 49, 52,), line B (2, 5, 8, 11, 14 . . . 44, 47, 50, 53) and line C (3, 6, 9, 12, 15 . . . 45, 48, 51, 54), it is received by the converter 1 of this embodiment, the sum of this data for each of the three lines A, B, C is calculated, the data giving the sums of lines B and C is compared with the previously-recorded results of calculation for the font image data, and where the result matches the sum of lines B and C, this is output as a 1-byte Standard code.

As explained in the flowchart in FIG. 3, conversion is performed as follows: first the image data is read in from the IBM 5550 CPU 3 (step 1), then every third byte starting at the second data item is summed (step 2), and in the same way, every third byte starting from the third data item is summed (step 3), the results of the two said additions are compared respectively with the addition results for font image data on the ROM 15 (step 4); where the said two data items are equal, the corresponding 1-byte Standard code is indicated (step 5), while if the two results are not equal to each other, there is no conversion to a Standard code and the data is discarded (step 6).

Various experiments carried out by the inventors of this invention proved that for all the image data output the inclusion of the sum of line A had no effect on the Standard code conversion, and in fact the exclusion of the sum of line A had the advantage of reducing discrimination time. Therefore in this embodiment if the sums of line B and line C match the sums of the font image data previously retrieved and recorded, Standard code conversion can be performed on the basis of those results. However, it is also acceptable to calculate the Standard code data by summing every third byte in each of line A, line B and line C, compare those addition results with the sums of the font image data previously recorded on the ROM 15.

Figure 5:
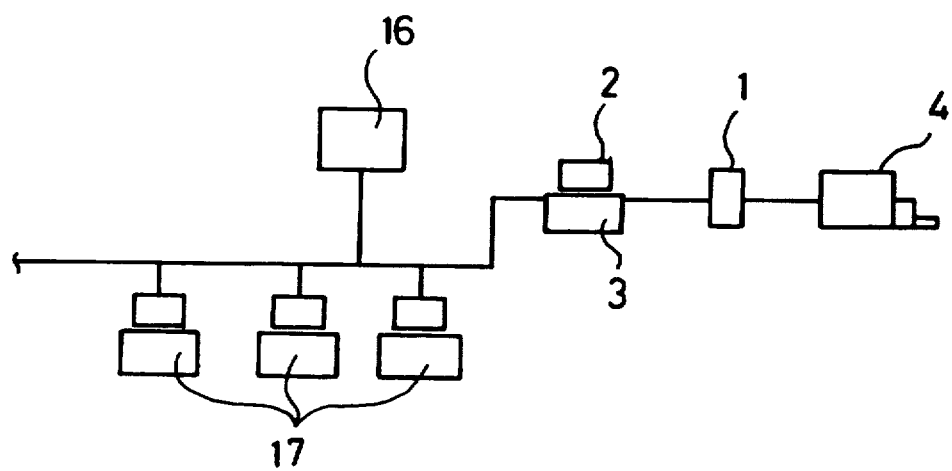
FIG. 5 is a conceptual diagram of the tag/label printing system.

Now, the tag and label printing system will be described with reference to FIG. 5.

An IBM 5550 personal computer 2 may be connected electrically to a label printer 4 via a converter 1 as described above. However, an IBM 5550 personal computer 2 may also be connected to a System 38 office computer 16 acting as being a host computer, and via that System 38 connection, to various terminals 17, thus providing online connection of the terminals 17, the System 38 16, the IBM 5550 2, the converter 1 and the label printer 4.

This therefore permits various types of required data already stored in the data base on the System 38 16 to be retrieved as desired at the terminals 17, and tags and labels to be printed with the required information at the label printer 4.

The said IBM 5550 2 can be used not only as a personal computer, but also as a multi-purpose workstation or as a workstation.

Further, in place of the said System 38 16, other types of computers such as a System 36, or one of the 43×× or 308× ranges of computers (all manufactured by IBM) can also be connected.

This invention permits the connection of a widely used type of personal computer, a personal computer with a Centronics interface, to a label printer. As well as providing a more effective way to use this type of personal computer, by connecting the personal computer into an online network via a host computer used as an office computer and the various terminals connected to it, the amount of manual input effort required from the operator in order to print tags and labels using the former type of RS-232C interface can be greatly reduced, and work efficiency increased because input errors are reduced. Further, since online data can be used without further processing, labels can be printed instantly where the data is generated, and accurate information for use in product sales and inventory management can be obtained.

By connecting this system with an online order system (EOS system) or a data entry system, and a price label printer, the printing of price tags can be automated, thus permitting more efficient operation by eliminating the necessity of maintaining a stock of price tags, and thereby reducing space and labor requirements.

In addition, because when a host or office computer such as a System 38 is used, the information required for label printing is stored in the data base of the said computer (as POS data or a POS master file), the required number of labels with the required data can be printed accurately, and systems development, hardware location (configuration), and processing can be made more efficient, costs can be reduced and accuracy immensely improved. The use of an office computer such as a System 38 as a host computer greatly increases system capacity, and by combining other software with this system it is possible to control more easily the printing of a wide range of POS price tags, previously difficult because of the limited capacity of the personal computer.

Installation of this system also has the effect of suppressing increases in the types of POS price tags, and delaying additional hardware purchases.

Connection of an online ordering system (EOS system) to a POS price tag printing system permits faster handling of retail store information, and thus promotes rationalization of the distribution industry.

What is claimed is:

1. A converter for being electrically connected between a computer and a label printer used for printing price tags and labels, said converter comprising a signal loop-back means coupled to said computer for looping back to said computer any meaningless or unsuitable signals picked up by the label printer; a print control command discard means coupled to said computer for discarding print control commands from said computer which are not required by the label printer; a fault-select signal conversion means coupled between said computer and printer for converting fault signs from said label printer to select signals for said computer; a paper-end or carbon-end to busy signal conversion means coupled between said computer and printer for converting a paper-end or carbon-end signal from the label printer to a busy signal for said computer; a logic reversal means coupled between said computer and said printer for converting select signals from said computer to positive logic for output to the label printer; a control code conversion means coupled between said computer and printer which presets a special character string in said computer which when outputted is converted to a control code for sending to the label printer; an image data-standard code conversion means coupled between said computer and printer which converts character and numeric image data sent from said computer to standard codes for said printer; a common-use kanji code discriminating means coupled to said computer for identifying common-use kanji character codes; a special character pattern conversion means coupled to said computer for converting second level kanji codes to special character patterns; and a ROM coupled to said special character pattern conversion means for matching the image data input using said image data and standard code conversion means with standard codes, storing it as font image data, and recording said special character patterns.

2. A converter according to claim 1, wherein said computer comprises a personal computer coupled via said converter to said label printer and a host computer coupled to said personal computer, said host computer having stored therein a data base of selectively retrievable information for supplying said selectively retrievable information to said personal computer for printing on said label printer.

3. A converter according to claim 1 wherein said converter is coupled to said computer and to said printer by a Centronics parallel interface.

* * * * *